(12) United States Patent
Nagakura

(10) Patent No.: US 6,337,685 B2
(45) Date of Patent: Jan. 8, 2002

(54) THREE-DIMENSIONAL MODEL GENERATION SYSTEM, THREE-DIMENSIONAL MODEL GENERATION METHOD, AND RECORDING MEDIUM STORING A THREE-DIMENSIONAL MODEL GENERATION PROGRAM

(75) Inventor: Masahiro Nagakura, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/162,145

(22) Filed: Sep. 29, 1998

(30) Foreign Application Priority Data

Apr. 22, 1998 (JP) .......................................... 10-111581

(51) Int. Cl.[7] .............................................. G06T 15/00
(52) U.S. Cl. ........................................ 345/419; 345/420
(58) Field of Search ................................ 345/419, 420, 345/433, 441, 442, 443, 619

(56) References Cited

U.S. PATENT DOCUMENTS

| | | | | |
|---|---|---|---|---|
| 5,103,217 A | * | 4/1992 | Cawley | 395/129 |
| 5,345,546 A | * | 9/1994 | Harada et al. | 395/142 |
| 5,671,343 A | * | 9/1997 | Kondo et al. | 395/119 |
| 5,701,403 A | * | 12/1997 | Watanabe et al. | 395/119 |
| 5,844,563 A | * | 12/1998 | Harada et al. | 345/420 |
| 5,856,828 A | * | 1/1999 | Letcher, Jr. | 345/420 |

\* cited by examiner

Primary Examiner—Mark Zimmerman
Assistant Examiner—Enrique L. Santiago
(74) Attorney, Agent, or Firm—Staas & Halsey LLP

(57) ABSTRACT

There is provided a three-dimensional model generation system which makes it possible to utilize a former edge of a fillet erased from a geometry as a result of generation of the fillet, as required. When a fillet is designated by an input device, a geometry-generating/editing section fetches a feature corresponding to the designated fillet, via a feature management section. When the feature is a fillet, a former edge data management section obtains former edge data associated with the fillet feature from three-dimensional data storage section, to generate three-dimensional display data. The geometry-generating/editing section utilizes the three-dimensional display data to display a former edge of the fillet on a display, for selection. Thus, the former edge can be dealt with in the same manner as normal edges, which makes it possible to define parameters with reference to the former edge, for a parametric entity function. Further, it is possible to project a former edge of a fillet when a three-dimensional geometry is projected onto a two-dimensional plane.

6 Claims, 12 Drawing Sheets

PROJECTING DIRECTION

THREE-DIMENSIONAL MODEL GENERATION SYSTEM, THREE-DIMENSIONAL MODEL GENERATION METHOD, AND RECORDING MEDIUM STORING A THREE-DIMENSIONAL MODEL GENERATION PROGRAM

BACKGROUND OF THE INVENTION

1. Field of the Invention

The present invention relates to a three-dimensional model generation system, and more particularly to a three-dimensional model generation system which is capable of saving data of an edge erased from a three-dimensional model upon filleting the edge, to thereby make it possible to utilize data of the edge.

2. Description of the Related Art

Conventionally, in the scenes of labor for creating designs of objects, computer aided design (CAD) systems are used as essential tools for saving labor and improving efficiency of designing operations. For instance, in the field of mechanical design and the like, there are widely used three-dimensional CAD systems which are capable of dealing with data of three-dimensional geometric objects as geometry data of three-dimensional objects having geometric properties similar to those of real objects.

In general, the technique of using computational geometry to define geometric objects is called "geometric modeling," and software for geometric modeling is called a modeler. Conventional modelers for use in three-dimensional CAD systems which deal with geometric objects include a free-form surface modeler suitable for designing free-form surfaces, e.g., those of a car body, and a solid modeler generally suitable for designing machines and structures. A model generated by the free-form surface modeler is called a free-form surface model, while a model by the solid modeler is called a solid model.

To fillet an existing edge is an important function provided by the three-dimensional CAD system in forming a three-dimensional geometric object by three-dimensional solid modeling. A parametric (variational) modeling capability is also an important function used in three-dimensional modeling for defining a geometric object based on values of dimensions with reference to an edge. The CAD system provides another important function of generating a two-dimensional design drawing based on a three-dimensional model generated.

FIG. 11 shows an example of conventional three-dimensional modeling carried out by a three-dimensional CAD system. A three-dimensional rectangular parallelepiped model 100 shown in the figure is generated at the outset. In order to fillet an edge 102 of the three-dimensional model 100, first, the edge 102 to be filleted is designated, and then a radius of a fillet to be generated is specified. As a result, a pictorial display of the three-dimensional model 100 on a display screen makes a transition in a direction indicated by an arrow 104 to a state of the model in which a fillet 106 is generated on the three-dimensional model 100 and at the same time the edge 102 is erased from the same.

As mentioned above, the three-dimensional CAD system has the parametric modeling capability of creating a new similar model by changing parameters which define the dimensions of each geometric object, the number of such objects, etc., of a model (parametric model). The parametric modeling capability includes a parametric entity function, e.g., that of defining a geometric object based on parameters associated with dimensional values defined with reference to an existing edge. To utilize this particular function in generating, e.g., a cylindrical shape representative of a through hole extending through the three-dimensional model 100, it is required that the edge is an existing geometric entity of the model 100. In the example shown in FIG. 11, however, the edge 102 has been erased when it was changed into the fillet 106. Therefore, it is basically impossible to directly utilize this particular parametric entity function of the CAD system after the associated geometric entity has been erased.

In such a case, the conventional CAD system is required to first erase the fillet 106 generated, extend two planes formerly defining the edge 102 to thereby regenerate an edge at a location whereby they meet, and thereafter define parameters associated with the shape by specifying dimensional values defined with reference to the regenerated edge.

Further, some CAD systems are provided with a function of "temporarily erasing" a generated fillet. According to this function, the existing fillet is temporarily erased, and then restored afterward. In this case as well, it is required to regenerate an edge after having erased the fillet temporarily.

In any case, in order to define parameters of a geometric object or shape defined with reference to an edge erased as a result of generation of the fillet 106, it is required to once erase the generated fillet 106 from the model 100 in some way or other. Therefore, the process proceeds in a direction indicated by an arrow 108 to regenerate the edge 102 which should have existed. Thereafter, the parametric entity function is utilized to generate a cylindrical shape by designating dimensional values defined with reference to the edges 102, 112 and a radius of the cylindrical shape 114. Then, the present process proceeds in a direction indicated by an arrow 116 to change the edge 102 into the fillet 106 by the filleting function again.

Further, the aforementioned function of a creating two-dimensional drawings from a three-dimensional model is often used to produce a design drawing. The two-dimensional drawing is generated by projecting the three-dimensional model onto a plane, and then dimension lines and the like are added to the generated drawing for completion of the same.

FIGS. 12(A), 12(B) and 12(C) illustrate an example of conventional drawing generation. FIG. 12(A) shows a state of a model in which fillets are not generated yet, while FIG. 12(B) shows a state of the model in which the fillets have been generated. FIG. 12(C) shows a sample of a two-dimensional drawing generated from the FIG. 12(A) model. Let it be assumed that the three-dimensional model 120 has already been generated as shown in FIG. 12(A), and edges 122, 124 are changed into fillets 126, 128, respectively. When the fillets 126, 128 are generated, the two edges 122, 124 are erased as shown in FIG. 12(B). If the three-dimensional model 120 in this state is projected in a direction indicated by an arrow 130 for generation of a two-dimensional drawing, a geometric FIG. 132 having both upper corners rounded is plotted as shown in FIG. 12(C). Afterward, dimension lines, dimension values, etc. are added to the generated projection drawing for completion of the two-dimensional drawing.

In this case, it may be desired that the dimension line is drawn to represent a dimension between the edges 122, 124 which existed before generation of the fillets 126, 128. However, the edges 122, 124 have been erased as a result of generation of the fillets 126, 128, so that when the three-dimensional model 120 is projected, the edges 122, 124 with reference to which the dimension line should be drawn are naturally not plotted on the two-dimensional drawing. In such a case, each dimension line is drawn between positions at which the edges are assumed to have existed.

As described above, in the conventional three-dimensional solid modeling, once an edge is filleted, the edge is deleted from the three-dimensional model, and hence, when the edge is needed afterward for performing the parametric entity function or the two-dimensional drawing generation function, it is required to regenerate the edge after removing the fillet, which makes operations troublesome. Further, although such an edge is regenerated by analogy of existing geometric entities, accurate analogy is often extremely difficult or even impossible, when the edge to be regenerated is a curved line.

SUMMARY OF THE INVENTION

It is an object of the invention to provide a three-dimensional model generation system which enables data of a "former edge" to be utilized as required, which has been erased from a three-dimensional model as a result of generation of a fillet.

To attain the above object, the present invention provides a three-dimensional model generation system for generating three-dimensional models, comprising geometry-generating/editing means that is capable of changing an edge of a three-dimensional model into a fillet or a chamfer, three-dimensional data storage means for storing geometry data items associated with respective features generated or edited by the geometry-generating/editing means, on a feature-by-feature basis, and when any of the respective features is a fillet or a chamfer, further storing data concerning an edge erased as a result of generation of the any of the features, as data of an former edge associated with the fillet or the chamfer, feature management means for obtaining any of the geometry data items stored in a state associated with a corresponding one of the features from the three-dimensional data storage means, in response to a request sent from the geometry-generating/editing means, for obtaining three-dimensional data of the any of the features, and former edge data management means for obtaining the data of the former edge from the three-dimensional data storage means in response to a request sent from the geometry-generating/editing means to the feature management means, for obtaining three-dimensional data concerning the feature of the fillet or the chamfer, and generating three-dimensional display data from the data of the former edge.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 4(A) and 4(B) are diagrams which are useful in explaining a process for generation of a three-dimensional model, in which FIG. 4(A) shows a rectangular parallelepiped generated, and FIG. 4(B) shows the rectangular parallelepiped on which a filleting operation has been carried out;

FIGS. 5(A) and 5(B) are block diagrams which are useful in describing locations of data items concerning the three-dimensional model, in which FIG. 5(A) shows locations of data items concerning the rectangular parallelepiped, and FIG. 5(B) shows locations of data items concerning the rectangular parallelepiped on which the filleting operation has been carried out;

FIG. 7 is a flowchart showing a flow of a process for enabling a former edge to be dealt with in the same manner as a normal edge is deal with;

FIGS. 8(A), 8(B), and 8(C) are diagrams which are useful in explaining a manner of utilization of a parametric entity function with reference to a former edge, in which FIG. 8(A) shows a state of a model in which a former edge is not displayed yet, FIG. 8(B) shows a state of the same in which the former edge is displayed, and FIG. 8(C) illustrates a state of the same in which a cylindrical feature has been generated by utilizing the former edge;

FIGS. 10(A), 10(B), and 10(C) are diagrams which are useful in explaining a process of generating a drawing, in which FIG. 10(A) shows a state of a model in which fillets are designated, FIG. 10(B) shows a state of the same in which former edges corresponding to the fillets are obtained, and FIG. 10(C) shows a sample of the drawing generated by using the former edges;

FIGS. 12(A), 12(B), and 12(C) are diagrams which are useful in explaining a drawing generation function, in which FIG. 12(A) shows a state of a model in which fillets are not generated yet, FIG. 12(B) shows a state of the same in which the fillets are generated, and FIG. 12(C) shows a sample of a generated two-dimensional drawing.

DESCRIPTION OF THE PREFERRED EMBODIMENTS

First, the outline of the present invention will be described below with reference to an accompanying drawing.

Figure 1:
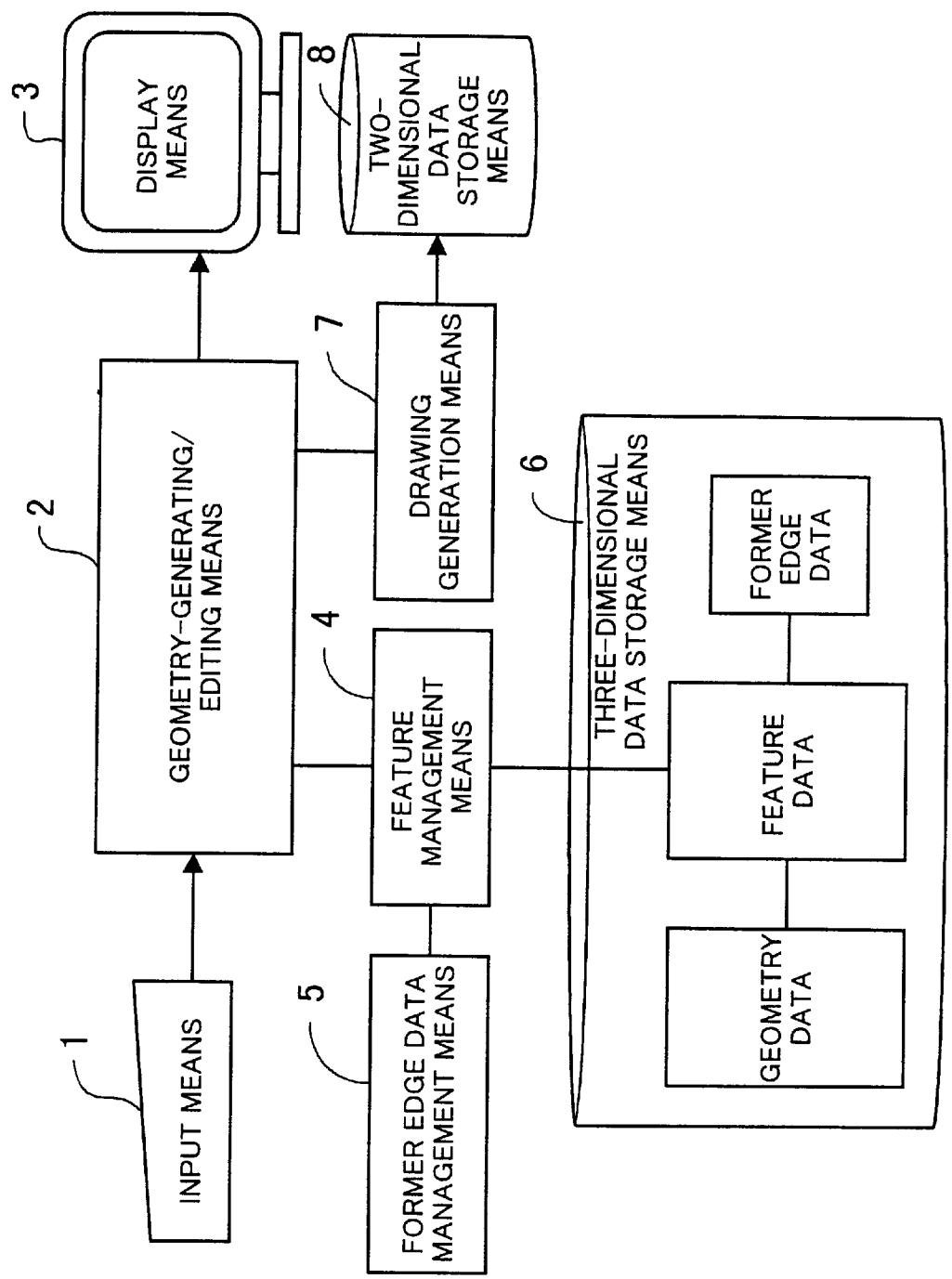
FIG. 1 is a conceptual presentation of principles of construction of the present invention.

FIG. 1 illustrates the principles of construction of the invention. A three-dimensional model generation system includes input means 1, geometry-generating/editing means 2, display means 3, feature management means 4, former edge data management means 5, three-dimensional data storage means 6, drawing generation means 7 and two-dimensional data storage means 8. The input means 1 instructs the geometry-generating/editing means 2 to generate a three-dimensional model, carry out various kinds of editing operation on the generated three-dimensional model, and so forth. The input means 1 is comprised of a keyboard for inputting alphanumeric characters, etc., and a pointing device such as a mouse and a tablet. The geometry-generating/editing means 2 generates a geometry (shape) of a three-dimensional model and edit the same according to various kinds of instructions inputted from the input means 1. The geometry-generating/editing means 2 is provided with basic processing capabilities essential to a three-dimensional CAD system for generation of three-dimensional models. Results of geometry-generating/editing operations performed by the geometry-generating/editing means 2 are displayed on the display means 3. The feature management means 4 saves three-dimensional data of features generated/edited by the geometry-generating/editing means 2 in the three-dimensional data storage means 6 and manages the same. When a feature which is being processed by the geometry-generating/editing means 2 is a fillet, the former edge data management means 5 fetches from the three-dimensional data storage means 6 former edge data stored therein in a state associated with the feature, so as to convert the same to data suitable for three-dimensional display. The drawing generation means 7 projects a three-dimensional model generated by the geometry-generating/editing means 2 onto a two-dimensional plane, based on geometry data of the model, to thereby generate two-dimensional data suitable for a two-dimensional drawing and store the data in the two-dimensional data storage means 8.

In three-dimensional modeling performed by the geometry-generating/editing means 2, if a generated feature is a fillet, the feature management means 4 stores data of an edge changed into the fillet, i.e. former edge data associated with the fillet feature in the three-dimensional data storage means 6, together with geometry data of the fillet.

When a fillet is designated by the input means 1 during generation or editing of geometry, the geometry-generating/editing means 2 requests the feature management means 4 to fetch a fillet feature corresponding to the designated fillet. The feature management means 4 recognizes the fillet feature and then requests the former edge data management means 5 to obtain former edge data associated with the fillet. The former edge data management means 5 obtains former edge data associated with the fillet feature from the three-dimensional storage means 6 and converts the same to data suitable for three-dimensional display. The feature management means 4 passes the data for three-dimensional display to the geometry-generating/editing means 2, whereby the display means 3 displays a former edge corresponding to the designated fillet, for selection. This enables the former edge erased from the three-dimensional geometry through generation of a fillet to be dealt with in the same manner as normal edges. As a result, it is possible to define parameters required for a parametric entity function with reference to the former edge. Further, if the fillet is designated when the three-dimensional geometry is projected onto a two-dimensional plane for generating a drawing, it is possible to project the former edge corresponding to the fillet onto the two-dimensional plane, which facilitates generation of dimension lines on the drawing.

Next, an embodiment of the present invention will be described based on an example in which the invention is applied to a three-dimensional CAD system.

Figure 2:
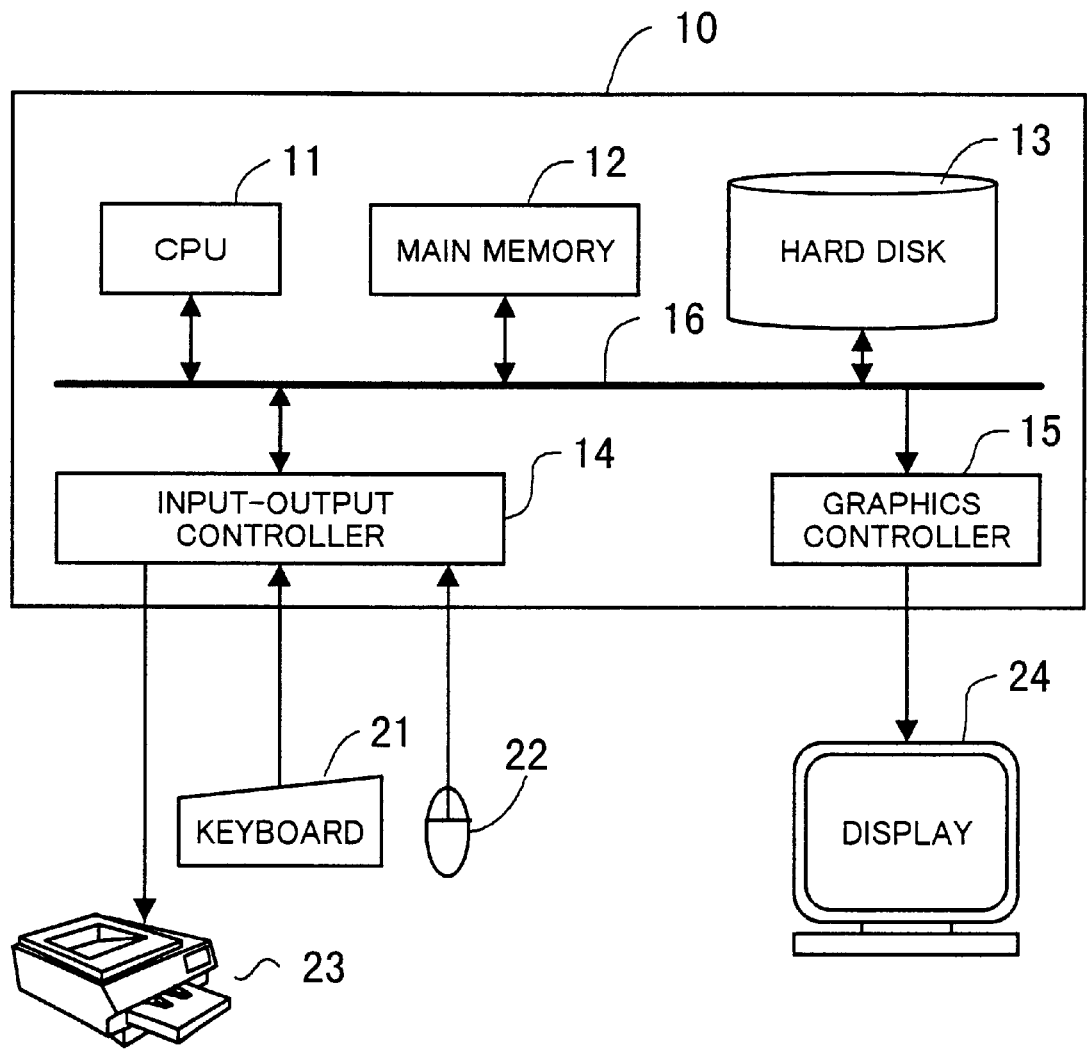
FIG. 2 is a block diagram showing an example of the whole arrangement of a three-dimensional CAD system.

FIG. 2 shows the whole arrangement of the three-dimensional CAD system including a computer 10 and various peripheral devices associated therewith. The computer 10 is comprised of a central processing unit (CPU) 11, a main memory 12, a hard disk 13, an input-output controller 14, and a graphics controller 15. These components of the computer 10 are connected by a bus 16. The input-output controller 14 is connected to a keyboard 21, a mouse 22, and a printer 23, while the graphics controller 15 is connected to a display 24. Further, the computer 10 may be provided with a local area network (LAN) board which allows interface with a database server managing CAD data, a digitizer which serves as an input device, or a plotter which serves as an output device, as required.

A system program for the three-dimensional CAD system is installed in the hard disk 13. The system program is loaded in the main memory 12 and executed by the CPU 11 for realizing various functions of the three-dimensional CAD system. Data of a three-dimensional model generated by the three-dimensional CAD system is stored in the hard disk 13. An input instruction to a three-dimensional model-generating function is generated by using the keyboard 21 and the mouse 22, and a result of the input is displayed on the display 24.

Next, the three-dimensional model-generating function of the system program of the three-dimensional CAD system will be described.

Figure 3:
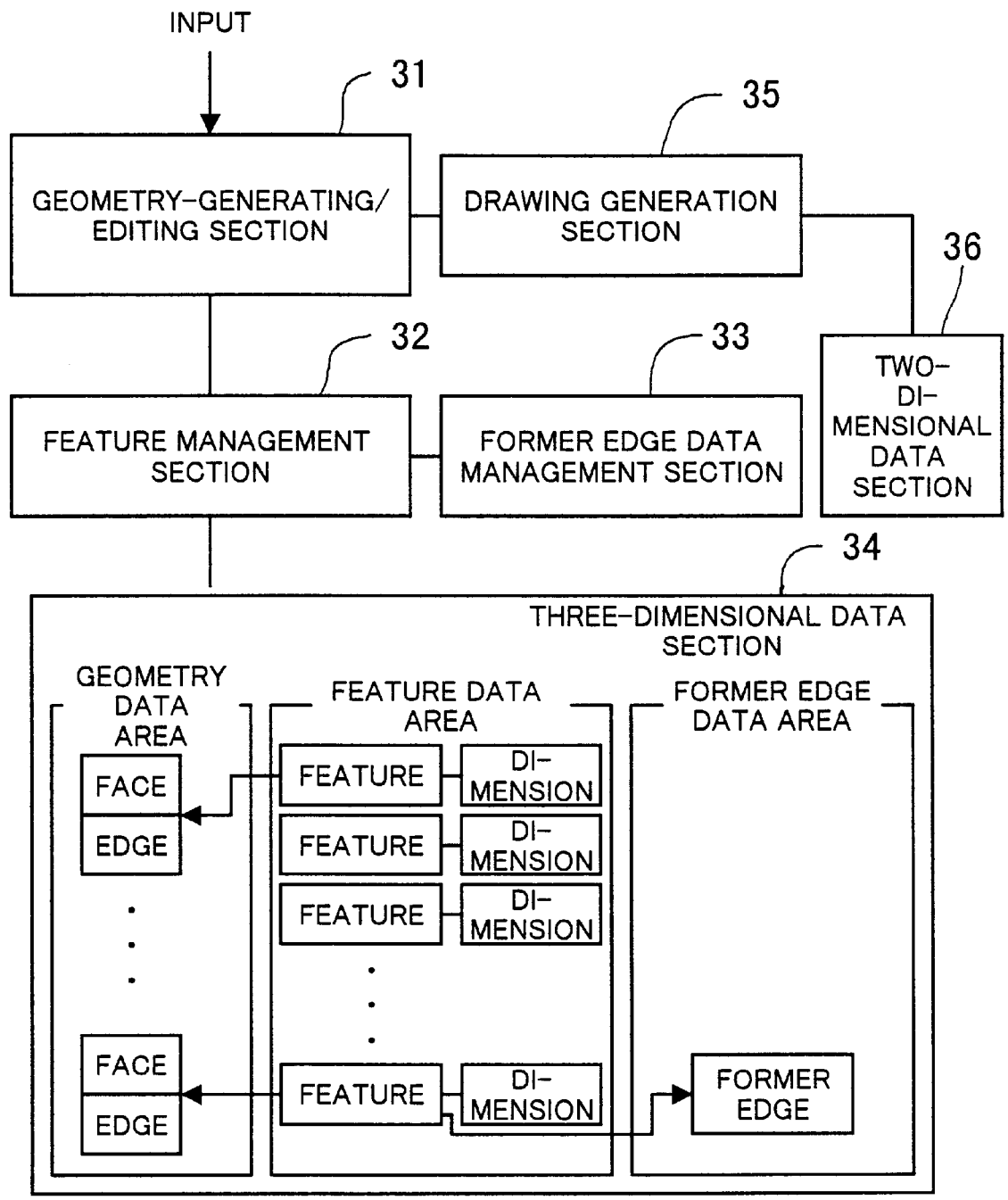
FIG. 3 is a block diagram showing an example of construction implementing a three-dimensional model-generating function.

FIG. 3 shows an example of construction implementing the three-dimensional model-generating function. The three-dimensional model-generating function is realized by a geometry-generating/editing section 31, a feature management section 32, a former edge management section 33, a three-dimensional data section 34, a drawing generation section 35, and a two-dimensional data section 36.

The geometry-generating/editing section 31 executes the same processing for generating/editing a three-dimensional geometry as is carried out by a conventional three-dimensional CAD system. The section 31 performs basic functions e.g. by generating a geometry of a rectangular parallelepiped in response to an input instruction, or further generating a cylindrical hole through the rectangular parallelepiped and at the same time changing parameters of the cylindrical shape to change a location of the same. Geometric units which the geometry-generating/editing section 31 generates to form a three-dimensional model, such as a rectangular parallelepiped, a hole, a projection, and a fillet, are each called a feature. The feature management section 32 saves data of features generated by the geometry-generating/editing section 31 in the three-dimensional data section 34 and manages the same. Feature data having a fillet attribute is managed by the former edge data management section 33 as well. The three-dimensional data section 34 stores items of three-dimensional data separately in a feature data area, a geometry data area, and a former edge data area. The feature data area stores feature names representing a rectangular parallelepiped, a fillet, etc., as well as the size of each feature. The geometry data area stores data concerning faces and edges which form the feature. Further, when the generated feature is a fillet, the former edge data area stores geometry data concerning a former edge which has been filleted. When a three-dimensional model is edited by the geometry-generating/editing section 31, data stored in the three-dimensional data section 34 is read out on a feature-by-feature basis via the feature management section 32, and results of editing are also written on a feature-by-feature basis.

The drawing generation section 35 generates two-dimensional data by projecting a three-dimensional model generated by the geometry-generating/editing section 31 onto a two-dimensional plane, to thereby generate a two-dimensional drawing. The two-dimensional data is stored in the two-dimensional data section 36 and used as a design drawing.

Next, an example of a process for generating a feature by the geometry-generating/editing section 31 will be described below.

Figure 4A:
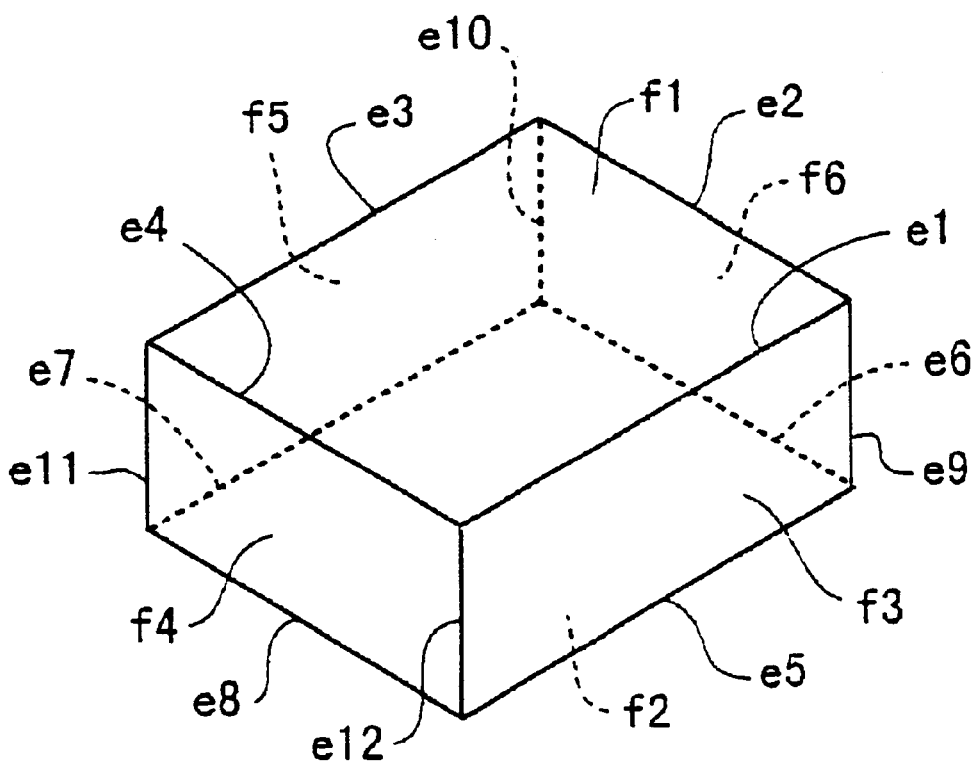
Figure 4B:
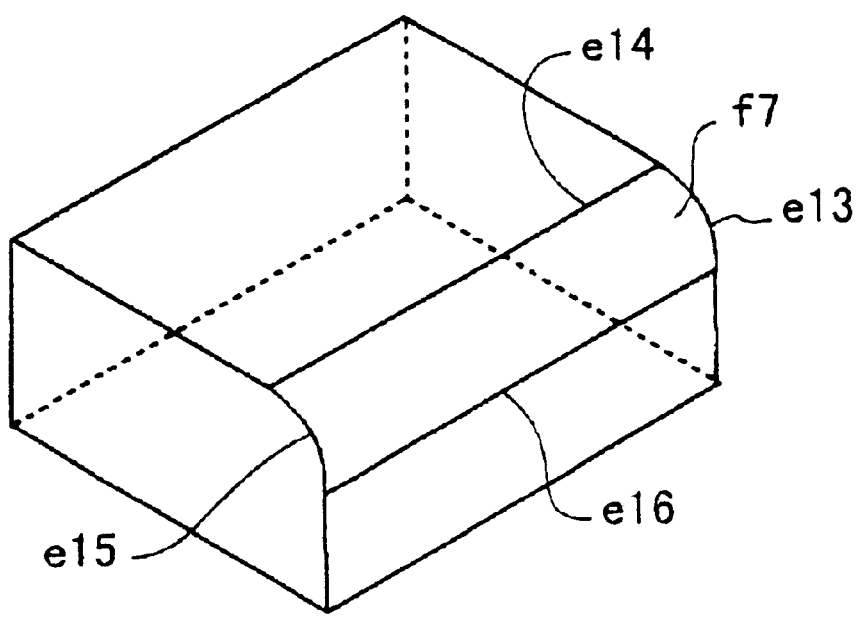

FIGS. 4(A) and 4(B) are diagrams for explaining the process for generation of a three-dimensional model. FIG. 4(A) shows a rectangular parallelepiped generated, while FIG. 4(B) shows the rectangular parallelepiped on which a filleting operation has been carried out. As shown in FIG. 4(A), the rectangular parallelepiped is formed by six faces f1 to f6 and twelve edges e1 to e12 each of which is an intersection of each adjacent pair of the six faces f1 to f6. When the rectangular parallelepiped is generated by the geometry-generating/editing section 31, data of the rectangular parallelepiped is generated which associates a feature name (ID: identifier) representative of the rectangular parallelepiped, the faces (face ID's) forming the rectangular parallelepiped, and the edges forming the respective faces, with each other.

In order to filleting the edge e1, the edge e1 is designated first, and then a fillet radius is designated. When a fillet having different radiuses at both ends thereof should be generated with respect to the edge e1, the two radiuses are separately specified with reference to the respective ends of the edge e1. As a result, a fillet face f7 is newly generated at a location where the edge e1 existed as shown in FIG. 4(B). At the same time, the edge e1, i.e., a former edge of the model disappears from a display screen, and edges e13 to e16 forming the fillet face f7 are displayed. In this case, shapes of the four faces f1, f3, f4, f6 which are adjacent to the fillet face f7 each undergo a change, so that data items concerning the four faces f1, f3, f4, f6 are updated.

These data items are stored in the three-dimensional data section 34. Next, locations of the data items of the rectangular parallelepiped on which the filleting operation has been carried out will be described.

Figure 5:
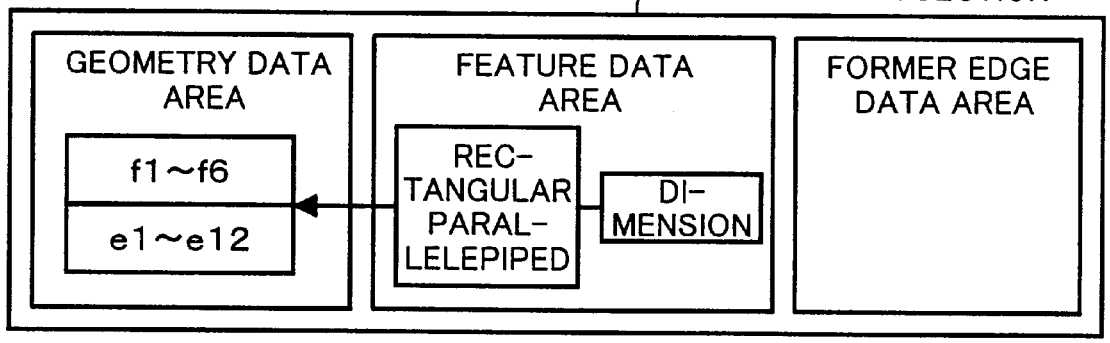
Figure 5:
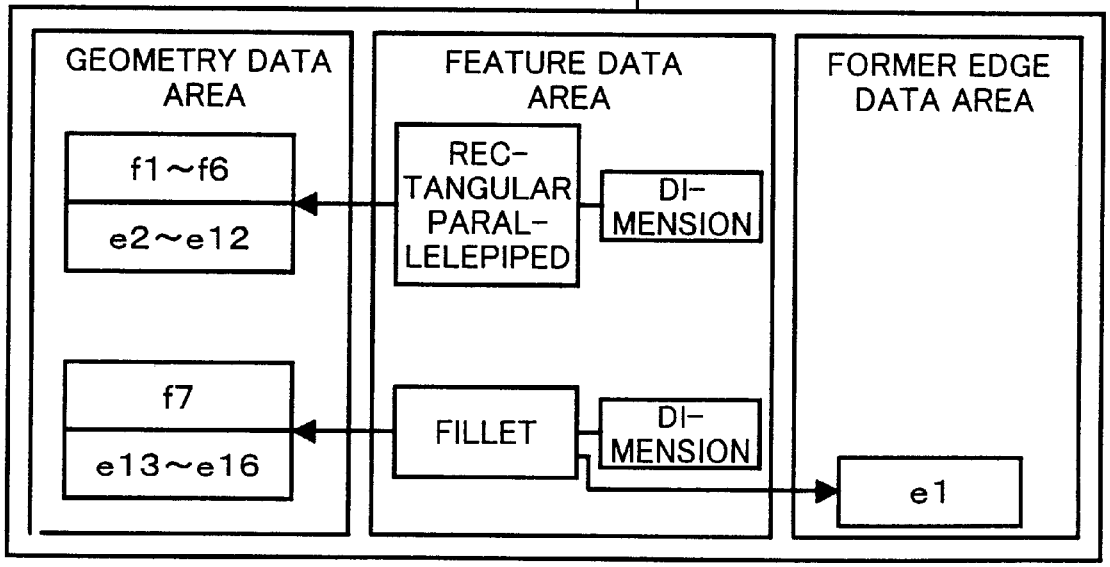

FIGS. 5(A) and 5(B) illustrate the locations of the respective data items of a three-dimensional model in the three-dimensional data section. FIG. 5(A) shows locations of the data items of the original or former rectangular parallelepiped, while FIG. 5(B) shows locations of the data items of the same on which the filleting operation has been carried out. When the rectangular parallelepiped is generated by the geometry-generating/editing section 31, the feature management section 32 registers the "rectangular parallelepiped" in the feature data area of the three-dimensional data section 34, and the faces f1 to f6 and the edges e1 to e12 in the geometry data area through association of the same with the "rectangular parallelepiped," as shown in FIG. 5(A).

Thereafter, when the edge e1 is filleted, the feature management section 32 registers the "fillet" in the feature data area, and the fillet face f7 and the edges e13 to e16 are in the geometry data area through association of the same with the "fillet". The edge e1 which was erased as a result of the generation of the fillet is deleted from the geometry data of the rectangular parallelepiped, and then the former edge e1 corresponding to the fillet is newly stored in the former edge data area through association of the same with the fillet.

As described above, when an edge of a three-dimensional model is filleted, the edge erased as a former edge as a result of the generation of the fillet is saved separately in a state associated with the fillet. Thus, the former edge is stored as a data item after being erased from the three-dimensional display of the model on which the filleting operation has been carried out, so that, it is possible to display the former edge on a screen as required, to thereby enable a parametric entity function to be carried out with reference to the former edge, or to utilize the former edge to set a reference point with reference to which a dimension line is drawn when a drawing is prepared. The processes carried out in the above cases will be described below.

Figure 6:
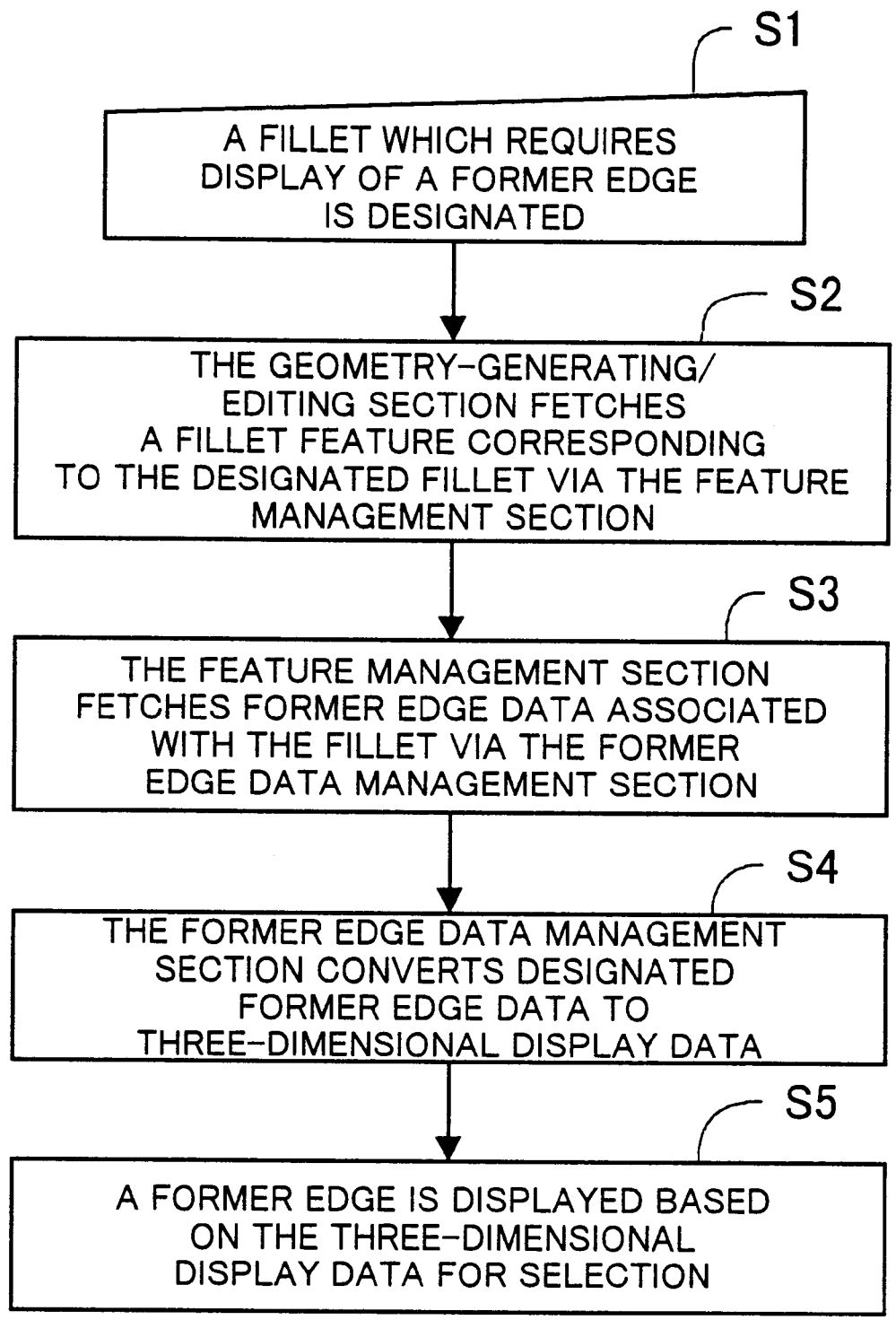
FIG. 6 is a flowchart showing a flow of a former edge display process.

FIG. 6 shows a flow of a former edge display process. In order to display a former edge corresponding to a three-dimensionally displayed fillet on the screen, first, the fillet requiring display of the former edge is designated by means of the input device such as the keyboard 21 or the mouse 22 (step S1). The fillet can be designated, for example, by picking a fillet face on the display screen or inputting a fillet feature name. Next, the geometry-generating/editing section 31 fetches a fillet feature corresponding to the designated fillet via the feature management section 32 (step S2). Then, the feature management section 32 fetches former edge data associated with the fillet from the three-dimensional data section 34 via the former edge data management section 33 (step S3). Since this former edge data read from the three-dimensional data section 34 is different in format from display data, the former edge data is converted to three-dimensional display data by the former edge data management section 33 (step S4). Finally, the geometry-generating/editing section 31 displays the former edge on the screen, based on the three-dimensional display data so as to permit selection of the former edge (step S5).

Figure 7:
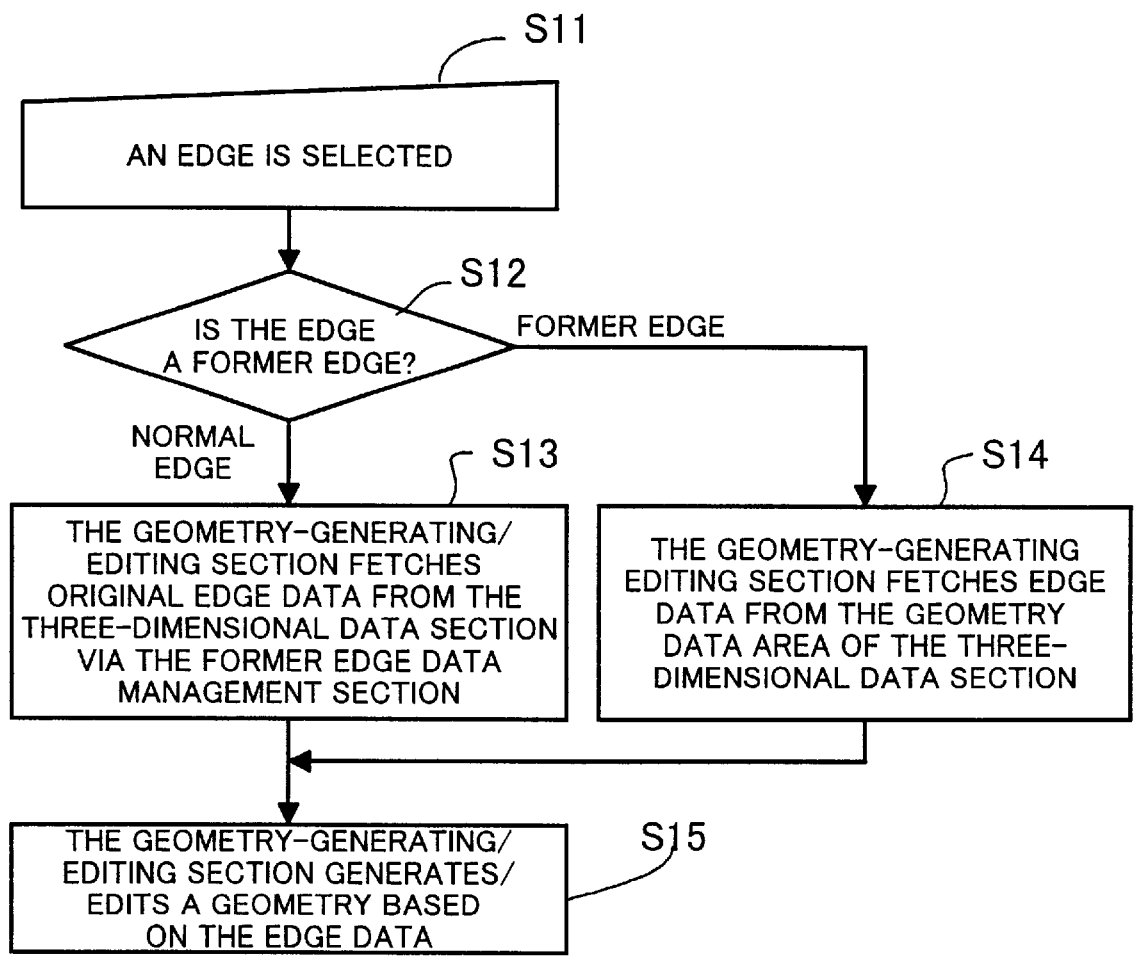

FIG. 7 shows a flow of a process for enabling a former edge to be dealt with in the same manner as a normal edge. First, when an edge is selected by the input device(step S11), it is determined whether the edge is a former edge or a normal edge (step S12). If the selected edge is a former edge, the geometry-generating/editing section 31 fetches former edge data from the three-dimensional data section 34 via the former edge data management section 33 (step S13), whereas if the selected edge is a normal one, the geometry-generating/editing section 31 fetches edge data from the geometry data area of the three-dimensional data section 34 (step S14). Thus, the geometry-generating/editing section 31 can obtain data associated with the selected edge, irrespective of whether the selected edge is a former edge or a normal one, and then generate/edit a geometry (shape) based on the fetched edge data (step S15).

Figure 8A:
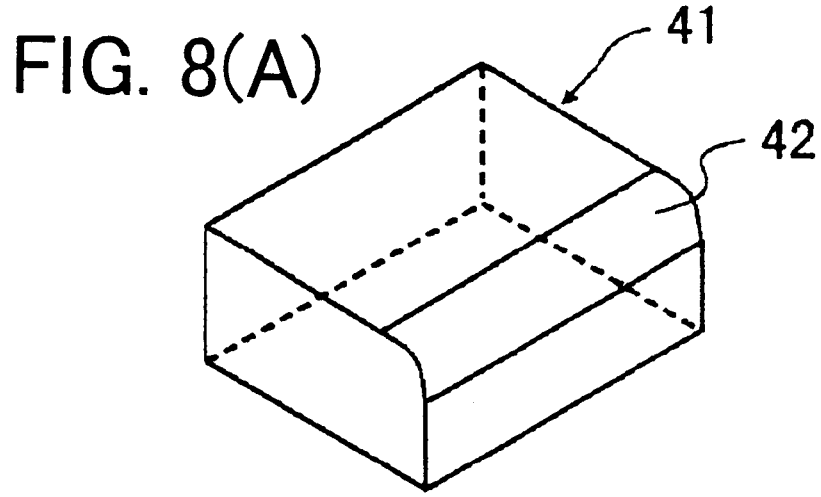
Figure 8B:
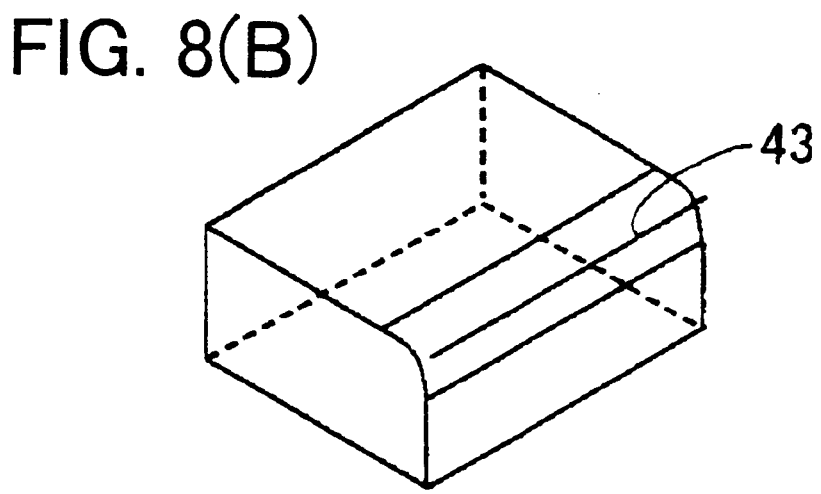
Figure 8C:
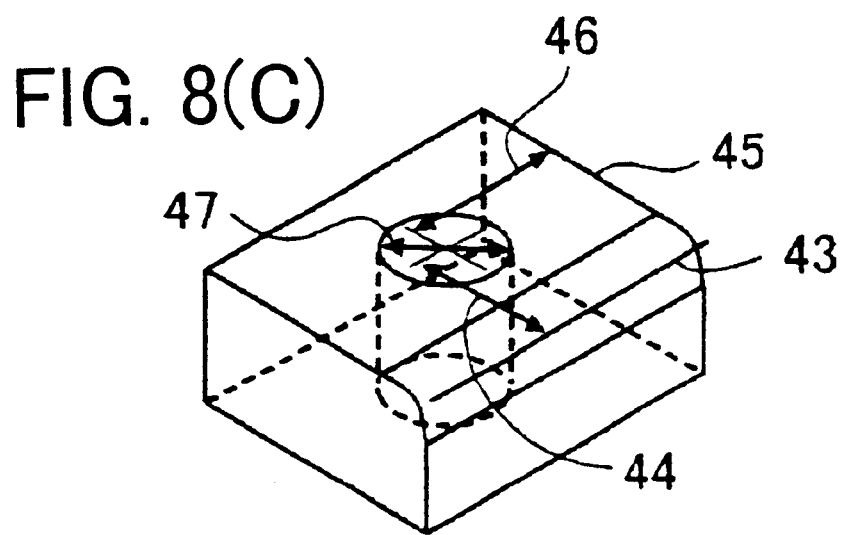

FIGS. 8(A), 8(B), and 8(C) show a manner of use of the parametric entity function performed using a former edge. FIG. 8(A) shows a state of a model in which a former edge is not displayed yet. FIG. 8(B) shows a state of the same in which the former edge is displayed, and FIG. 8(C) illustrates a cylindrical feature generated by the use of the former edge. Let it be assumed that a three-dimensional model formed by the geometry of a rectangular parallelepiped 41 with a fillet 42 formed by filleting has been generated as shown in FIG. 8(A) and that a cylindrical through hole is to be made through the filleted model. In this case, when faces of the rectangular parallelepiped 41 modified through generation of the fillet 42 are specified, the geometry-generating/editing section 31 requests the feature management section 32 to obtain former edge data. The feature management section 32 requests the former edge data management section 33 to obtain the former edge data and convert the data to three-dimensional display data, and then delivers the generated three-dimensional display data to the geometry-generating/editing section 31 as former edge data. As a result, the former edge 43 corresponding to the fillet 42 is displayed as shown in FIG. 8(B), which enables the former edge 43 to be dealt with in the same manner as normal edges forming the rectangular parallelepiped 41 are dealt with. When the cylindrical through hole is made by the use of the parametric entity function as shown in FIG. 8(C), the former edge 43 which is now selectable is designated, and a dimension 44 defined with reference to the former edge 43 is inputted e.g. by means of the keyboard 21. Similarly, by designating an edge 45 forming part of the rectangular parallelepiped 41, a dimension 46 defined with reference to the edge 45 is inputted and further a desired diameter of the cylindrical hole is inputted. In this case, a dimension of the hole in the direction of its depth is not specified. This creates a cylindrical feature, i.e. a through hole extending through the rectangular parallelepiped 41, which has a top open end whose center is distant from the former edge 43 and the edge 45 by the respective dimensions 44, 46 and whose diameter has the specified dimension 47. As described above, when the parametric entity function using a dimension taken with reference to a former edge associated with a fillet is utilized, the former edge erased through generation of the fillet can be restored to the display screen without any need of regeneration. Further, the former edge can be dealt with in the same manner as the normal edges are dealt with in designating dimensions of a geometric object with reference thereto.

Next, a process of generation of a two-dimensional drawing from data of a three-dimensional model will be described.

Figure 9:
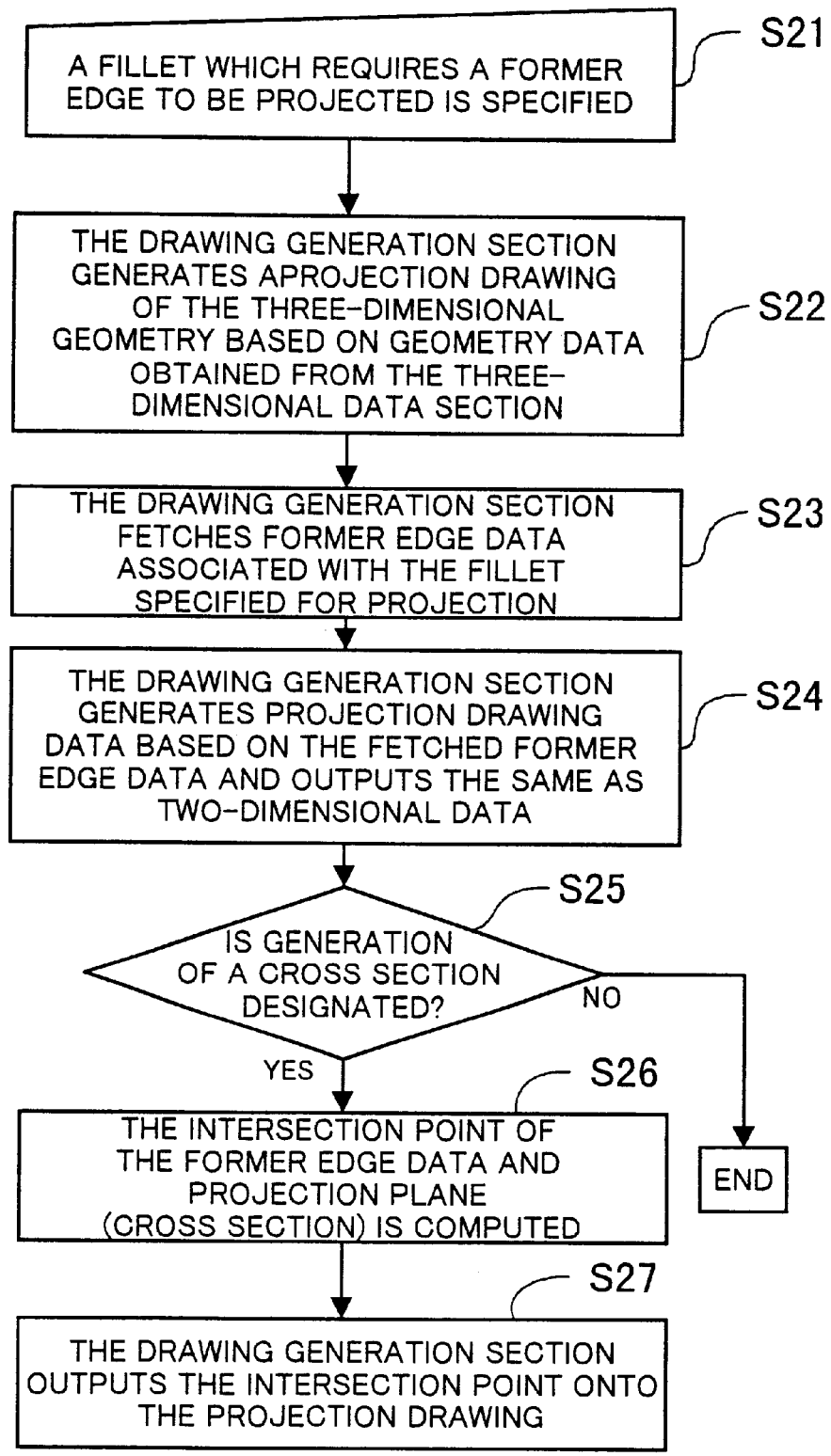
FIG. 9 is a flowchart showing a flow of a process for projecting the former edge onto a drawing.

FIG. 9 shows a flow of a process for projecting a former edge corresponding to a generated fillet onto a drawing. First, the fillet which requires projection of the former edge is designated in advance by using an input device such as the mouse 22 (step S21). Next, the drawing generation section 35 generates a projection drawing of a three-dimensional geometry, based on geometry data obtained from the three-dimensional data section 34 (step S22). Further, the drawing generation section 35 fetches former edge data associated with the fillet designated for projection from the three-dimensional data section 34 via the feature management section 32 and the former edge data management section 33 (step S23). The drawing generation section 35 generates projection drawing data based on the fetched former edge data and outputs the generated data to the two-dimensional data section 36 as two-dimensional data (step S24). Next, it is determined whether or not generation of a cross section is designated(step S25). The generation of a cross section is designated when a cross section of the former edge taken with respect to a specified plane is required to be utilized instead of a simple projection of the former edge. For instance, if a former edge which is arcuate in cross section when taken from a direction perpendicular to a projecting direction is simply projected, it is only shown on a projection plane as a straight line. As a result, when a dimension line from the former edge is required in a cross-sectional view, a position with reference to which the dimension line should be drawn cannot be specified. To avoid this inconvenience, it is required to project an intersection point of the former edge and a plane (cross section) spreading in a direction perpendicular to a projecting direction at any desired location in the projecting direction. This causes the former edge to be expressed as a point, whereby the dimension line on the cross section can be drawn from the point. Therefore, if the generation of a cross section is specified, the drawing generation section 35 determines an intersection point of the former edge corresponding to the designated fillet and the projection plane (step S26) and then outputs the intersection point onto the projection drawing (step S27). If it is determined at the step S25 that generation of a cross section is not specified, the process for generating a drawing is terminated.

Figure 10A:
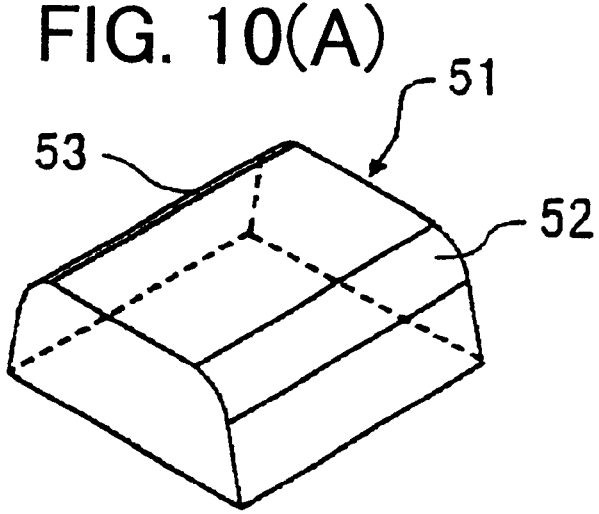
Figure 10B:
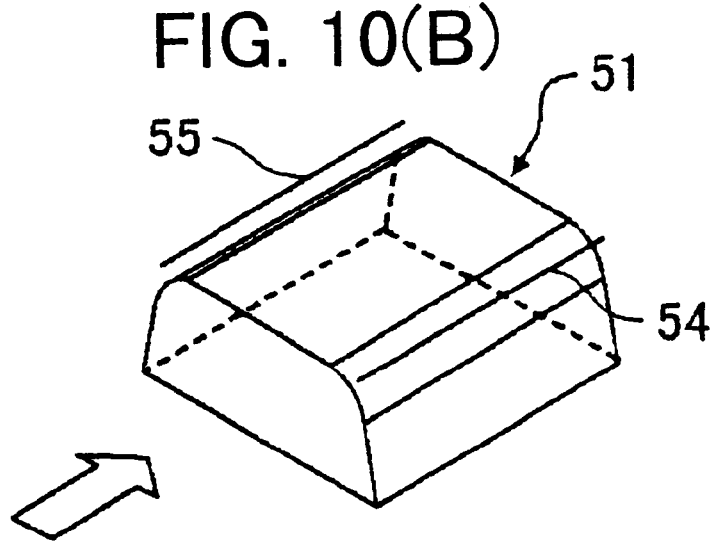
Figure 10C:
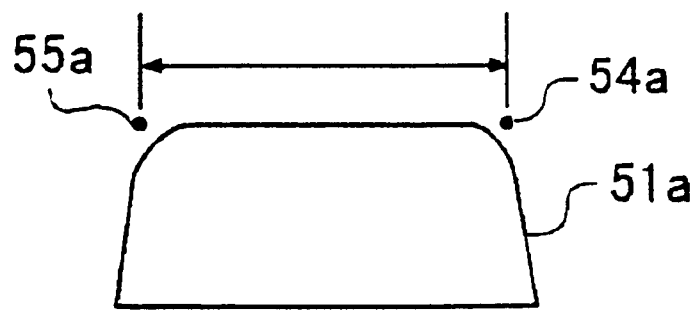
Figure 11:
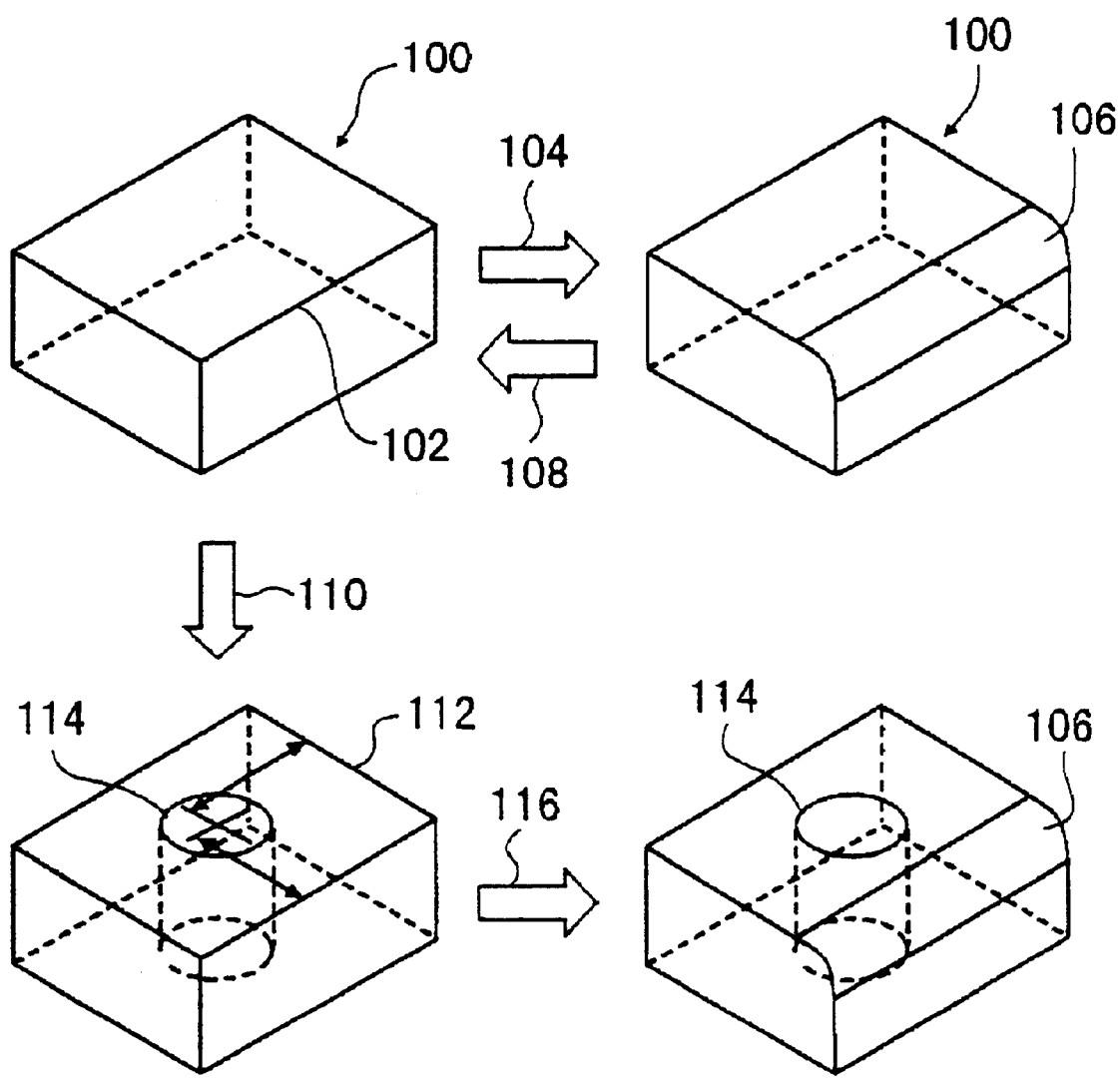
FIG. 11 is a diagram which is useful in explaining a process of conventional three-dimensional solid modeling.
Figure 12A:
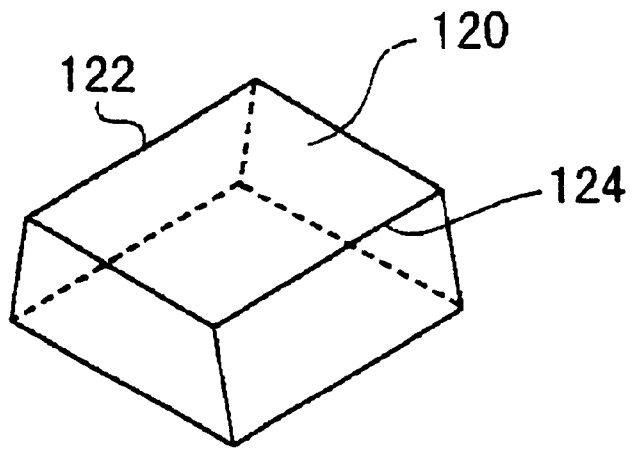
Figure 12B:
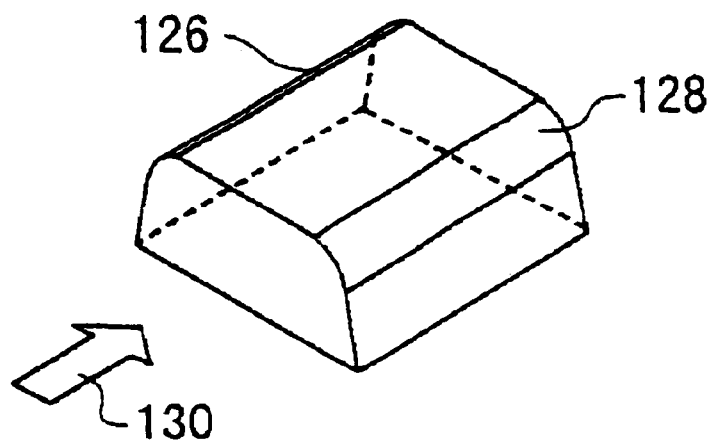
Figure 12C:
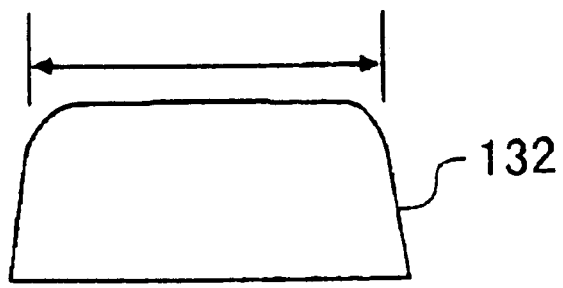

FIGS. 10(A), 10(B), and 10(C) show an example of the process for generating a drawing. FIG. 10(A) shows a state of a model in which fillets are designated, and FIG. 10(B) shows a state of the same in which former edges corresponding to the fillets are obtained. Further, FIG. 10(C) shows an example of a drawing generated by utilizing the former edges. Now, a case is considered in which a two-dimensional drawing is generated from the three-dimensional geometry of a rectangular parallelepiped 51 having two edges thereof changed into fillets 52, 53 respectively as shown in FIG. 10(A). First, faces of the fillets 52, 53 which requires display of corresponding former edges are designated. As shown in FIG. 10(C), the drawing generation section 35 generates a three-dimensional projection drawing 51a based on geometry data obtained from the three-dimensional data section 34 via the geometry-generating/editing section 31. Further, the drawing generation section 35 obtains data associated with the former edges 54, 55 corresponding to the fillets 52, 53 shown in FIG. 10(B) through the geometry-generating/editing section 31, generates projection drawing data from the former edge data for generating projection drawings of the former edges 54, 55, and outputs the generated projection drawing data as two-dimensional data. Thus, the former edges 54, 55 are expressed as two points 54a, 55a in the projection drawing. In the example shown in FIGS. 10(B) and 10(C), since the direction in which the former edges 54, 55 extend is identical with the projecting direction, the former edges 54, 55 are expressed as the respective points on the projection drawing, so that the generation of a cross section is not specified.

Although in the above embodiments, description is made of a case in which a filleting operation is carried out on an edge to form a fillet having an arcuate cross section, this is not limitative, but the present invention can also be applied to a case in which a chamfering operation is carried out on an edge portion of a three-dimensional model by cutting the portion linearly and diagonally to form an inclined plane.

Further, the above processing capabilities which a computer should have can be written in a program recorded within a computer-readable recording medium. The computer executes the program for realizing the processing capabilities. The computer-readable recording medium may be a magnetic recording medium, semiconductor memory or the like. In order to market the program, it is possible to store them on transportable recording media such as CD-ROMs and floppy disks for distribution, or store the same on a storage device connected to a computer via a network for transfer to other computers. Each program is executed by storing it on a hard disk within the computer and loading it into main memory.

As described above, according to the present invention, when an edge of a three-dimensional model is changed into a fillet, data of a former edge of the edge portion erased from the three-dimensional geometry as a result of generation of the fillet is stored as data associated with the fillet such that the data can be fetched whenever the fillet is designated during three-dimensional modeling, for display of the former edge. Therefore, a former edge corresponding to a fillet can always be utilized as required for three-dimensional modeling, particularly in designating parameters used in a parametric entity function based on dimensions defined in relation to the former edge, which makes it possible to improve modeling efficiency.

Further, in generation of a two-dimensional drawing, it is possible to designate a fillet and thereby plot a former edge at a location where it was before generation of the fillet, which facilitates drawing of dimension lines and so forth.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A three-dimensional model generation system for generating three-dimensional models, comprising:
   a geometry-generating/editing section that is capable of changing an edge of a three-dimensional model into a fillet or a chamfer;
   a three-dimensional data storage section storing geometry data items associated with respective features generated or edited by said geometry-generating/editing section, on a feature-by-feature basis, and when any of said respective features is a fillet or a chamfer, further storing data concerning an edge erased as a result of generation of said any of said features, as data of a former edge associated with said fillet or said chamfer;
   a feature management section obtaining any of said geometry data items stored in a state associated with a corresponding one of said features from said three-dimensional data storage section, in response to a request sent from said geometry-generating/editing section, for obtaining three-dimensional data of said any of said features; and
   a former edge data management section obtaining said data of said former edge from said three-dimensional data storage section in response to a request sent from said geometry-generating/editing section to said feature management section, for obtaining three-dimensional data concerning said feature of said fillet or said chamfer, and generating three-dimensional display data from said data of said former edge, wherein said former edge is displayed for selection, based on said three-dimensional display data obtained via said feature management section and said former edge data management section according to designation of said fillet or said chamfer, and said former edge is utilized to set a reference point with reference to which a dimension line is drawn when a drawing is prepared.

2. A three-dimensional model generation system according to claim 1, further including a two-dimensional drawing generation section generating a two-dimensional drawing from said geometry data of said three-dimensional model.

3. A three-dimensional model generation method of generating a three-dimensional model, comprising:
   designating a fillet or a chamfer;
   obtaining data of a former edge stored in association with a feature of said fillet or said chamfer which is designated;
   generating three-dimensional display data from said data of said former edge; and
   displaying said three-dimensional display data, for selection, in a manner such that said former edge data can be dealt in the same manner as a normal edge is dealt with, wherein said former edge is utilized to set a reference point with reference to which a dimension line is drawn when a drawing is prepared.

4. A two-dimensional drawing generation method of generating a two-dimensional drawing by projecting a three-dimensional model onto a two-dimensional plane, comprising:
   designating a fillet or a chamfer;
   generating a two-dimensional projection drawing by using geometry data stored in association with a feature of said fillet or said chamfer designated;
   generating projection drawing data by using data of a former edge stored in association with said feature of said fillet or said chamfer; and
   generating a projection drawing of said edge, based on said generated projection drawing data, wherein said former edge is utilized to set a reference point with reference to which a dimension line is drawn when a drawing is prepared.

5. A two-dimensional drawing generation method according to claim 4, wherein when generation of a cross section is designated in generating said projection drawing of said edge, a point of intersection of said data of said former edge associated with said fillet or said chamfer designated with a cross section to be projected is computed, and said intersection point is outputted onto a projection drawing.

6. A computer-readable recording medium storing a program for generating a three-dimensional model, said program comprising:
   a geometry-generating/editing section which is capable of changing an edge of a three-dimensional model into a fillet or a chamfer;
   a three-dimensional data storage section;
   a feature management section associating geometry data items with respective features generated or edited by said geometry-generating/editing section on a feature-by-feature basis, and when any of said features is a fillet or a chamfer, associating data of an edge erased as a result of generation of said fillet or chamfer as a data of a former edge data associated with said fillet or said chamfer, for storage in three-dimensional data storage section, as well as obtaining any of said geometry data items stored in association with a corresponding one of said respective features from said three-dimensional data storage section, in response to a request sent from said geometry-generating/editing section for obtaining three-dimensional data of said any of said features;
   a former edge data management section generating three-dimensional display data from said data of said former edge obtained by said feature management section from said three-dimensional data storage section in response to a request sent from said geometry-generating/editing section to said feature management section for obtaining three-dimensional data of said feature of said fillet or said chamfer; and
   a two-dimensional drawing section generating a two-dimensional drawings based on said any of geometry data items of said three-dimensional model, wherein said former edge is utilized to set a reference point with reference to which a dimension line is drawn when a drawing is prepared.

* * * * *